E. SCHNELLE.
NUT LOCK.
APPLICATION FILED JUNE 13, 1910.

971,150. Patented Sept. 27, 1910.

Witnesses
A. M. Whitmore.
E. B. Whitmore

Inventor
Ernest Schnelle
By H. H. Simms
his Attorney

THE NORRIS PETERS CO., WASHINGTON, D. C.

UNITED STATES PATENT OFFICE.

ERNEST SCHNELLE, OF ROCHESTER, NEW YORK, ASSIGNOR OF ONE-HALF TO ALEXANDER ROSS, OF ROCHESTER, NEW YORK.

NUT-LOCK.

971,150.          Specification of Letters Patent.     Patented Sept. 27, 1910.

Application filed June 13, 1910. Serial No. 566,621.

*To all whom it may concern:*

Be it known that I, ERNEST SCHNELLE, of Rochester, in the county of Monroe and State of New York, have invented a new and useful Improvement in Nut-Locks, which improvement is fully set forth in the following specification and shown in the accompanying drawings.

The present invention relates to nut locks and more particularly to that type in which either the bolt or the nut carries a securing device which automatically locks said parts against relative turning, an object of the invention being to provide a construction which will permit the separation of the nut and the bolt without mutilating the threads on either of said parts to such a degree that they have no further use.

Another object of the invention is to provide a nut lock that is inexpensive to manufacture, simple in operation, and durable and effective in use.

To these and other ends the invention consists of certain parts and combinations of parts all to be hereinafter described, the novel features thereof being pointed out in the appended claims.

Figure 1:
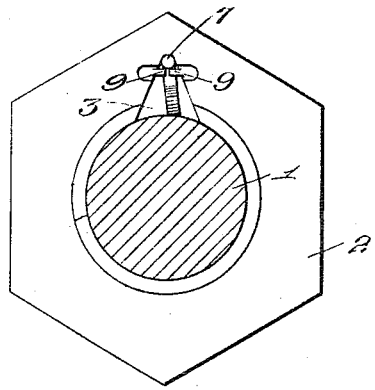
Figure 2:
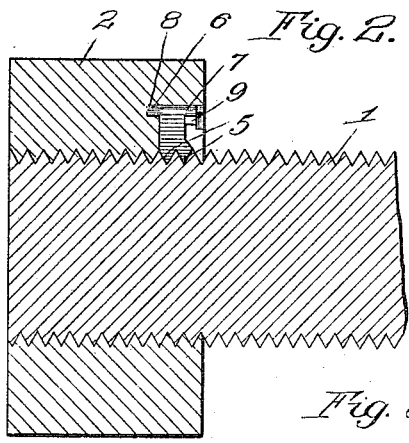
Figures 3, 4:
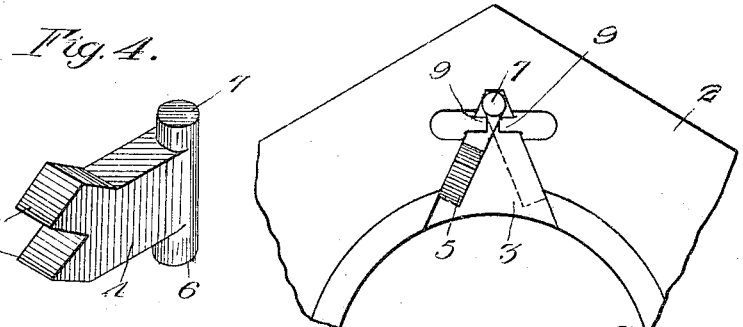

In the drawings: Figure 1 is a view of the inner face of a nut embodying the present improvements; Fig. 2 shows a sectional view of the nut, applied to a bolt; Fig. 3 is an enlarged detail view of the nut: and Fig. 4 is a perspective view of the securing device.

In the present invention either the bolt 1 or the nut 2, preferably the latter, is provided with a chamber or recess 3 which in this instance is of V-shape in formation, communicates with the threaded bore 4 and has one half thereof located on each side of a radial line through the axis of the nut and the apex of the V. The recess or chamber may be provided in the inner face of the nut so that when the latter is applied to the bolt and abuts an article clamped thereby, said recess will be invisible and will be protected against dirt and ice.

The securing device is movably arranged in the chamber or recess 3 and preferably comprises a dog 4 having teeth 5 to straddle the threads of the bolt and pivotally mounted at the apex of the V so that its swinging or free end may move an equal distance on opposite sides of a radial line through the axis of the nut and the axis of the swinging member. An inexpensive manner of pivotally mounting the dog or securing device is to provide the latter with integral pintles 6 and 7 on opposite sides thereof, the former fitting in a bearing socket 8 formed in the inner wall of the recess and the latter being held between two projections 9 formed by upsetting the metal of the opposite side walls of the recess.

In using the invention the nut is turned on the bolt until the desired position is reached, the dog or securing device 4 riding freely on the threads of the bolt and permitting the turning in one direction without any hindrance. When the desired position is reached the nut is held against accidental turning in the direction of removal, as the arc, which the outer end of the dog makes, intersects the circumference of the bolt. The chamber or recess 3 however is so formed that space is provided on the opposite sides of the dog, the length of the dog being such that, while the nut cannot turn under the influence of vibrations or shocks, a strain on the nut in the direction of unscrewing will cause the free end of the dog to compress the metal of the bolt and swing to the opposite end of the chamber, when the nut may be removed with ease as it will ride on the bolt. As the free end of the dog is toothed to correspond to the threads, the latter are not mutilated and it is therefore possible to again use the bolt.

From the foregoing, it will be seen that there has been provided a structure which will effectually secure the nut against turning due to shocks or vibrations, while at the same time permitting the removal of the nut without injury to the bolt. This removal is effected without the use of special tools as the ordinary wrench causes both the locking and the unlocking of the parts.

The structure is inexpensive to manufacture and the parts are few and not liable to get out of order.

What I claim as my invention and desire to secure by Letters-Patent is:

1. The combination with a nut and a bolt, one of which is provided with a chamber, of a rigid securing device mounted in the chamber to frictionally engage the other part, the chamber in which the securing device is located having releasing space on opposite sides of the securing position of the device, permitting the latter to move in either direction from engaging position.

2. A nut provided with a chamber communicating with its threaded bore and a rigid securing device movable in the chamber to frictionally engage a threaded member within the threaded bore, the chamber in which said device is mounted providing releasing space on opposite sides of said device when the latter is in securing position, so that the said device may move in either direction from engaging position.

3. The combination with a nut and a bolt, one of which is provided with a chamber, of a rigid securing device pivoted in the chamber to frictionally engage the other part, the chamber in which the securing device is pivoted having releasing space on opposite sides of the securing position of the device permitting the latter to move in either direction from engaging position.

4. A nut having a chamber therein communicating with its threaded bore, and a rigid securing device pivotally mounted in the chamber, said chamber providing releasing space on opposite sides of the securing device when the latter is in securing position permitting said device to move in either direction from such position.

5. A nut provided with a V-shaped recess communicating with the threaded bore and a rigid securing device pivoted at the apex of said recess, the length of the securing device being such that when it engages either wall of the recess it does not engage a threaded member on which the nut is fitted but when in an intermediate position it frictionally engages such threaded member.

6. A nut provided with a recess, a securing device arranged in said recess and having pintles projecting from opposite sides thereof one of said pintles turning in the nut, and projections upset from opposite side walls of the recess and coöperating with the side of the other pintle to retain the securing device in position.

7. A nut provided with a recess and a bearing socket in one wall of the recess, a securing device arranged in said recess and having pintles projecting from opposite sides thereof one of said pintles fitting in the bearing socket, and projections extending from opposite walls of the recess and coöperating with the other pintle.

In witness whereof, I have hereunto set my hand this 9th day of June, 1910, in the presence of two subscribing witnesses.

ERNEST SCHNELLE.

Witnesses:
H. H. SIMMS,
A. M. WHITMORE.